(12) United States Patent
Dunjic et al.

(10) Patent No.: US 11,665,155 B2
(45) Date of Patent: *May 30, 2023

(54) SYSTEMS AND METHODS FOR CONTROLLING THIRD-PARTY ACCESS OF A PROTECTED DATA RESOURCE

(71) Applicant: The Toronto-Dominion Bank, Toronto (CA)

(72) Inventors: Milos Dunjic, Oakville (CA); David Samuel Tax, Toronto (CA); Gregory Albert Kliewer, Barrie (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/721,259

(22) Filed: Apr. 14, 2022

(65) Prior Publication Data

US 2022/0239643 A1    Jul. 28, 2022

Related U.S. Application Data

(63) Continuation of application No. 16/561,260, filed on Sep. 5, 2019, now Pat. No. 11,343,239.

(51) Int. Cl.
*G06F 21/00* (2013.01)
*H04L 9/40* (2022.01)
*G06F 9/451* (2018.01)

(52) U.S. Cl.
CPC .......... *H04L 63/0853* (2013.01); *G06F 9/451* (2018.02); *H04L 63/102* (2013.01)

(58) Field of Classification Search
CPC . H04L 63/0853; H04L 63/102; H04L 63/108; G06F 9/451; G06F 9/4451
See application file for complete search history.

(56) References Cited

U.S. PATENT DOCUMENTS 7,383,231 B2    6/2008  Gupta et al.
8,326,725 B2   12/2012  Elwell et al.
(Continued)

OTHER PUBLICATIONS

H. Olesen and S. Khajuria, "Accessing and Disclosing Protected Resources: A User-Centric View," 2015 IEEE 81st Vehicular Technology Conference (VTC Spring), 2015, pp. 1-5, doi: 10.1109/VTCSpring.2015.7145662. (Year: 2015).*

(Continued)

*Primary Examiner* — Kendall Dolly
(74) *Attorney, Agent, or Firm* — Rowand LLP

(57) ABSTRACT

A computer-implemented method is disclosed. The method includes: obtaining an access token associated with a first application, the access token including historical operations data identifying operations previously performed by the first application in accessing a user account at a protected data resource; receiving a first request for the first application to perform a first access operation in connection with the user account using the access token; determining that the first access operation is not permitted based on the historical operations data; and in response to determining that the first access operation is not permitted: modifying the first request to obtain a second request for the first application to perform a second access operation using the access token such that a totality of one or more historical operations and the second access operation comply with access permissions for the first application to access the user account; and transmitting the second request to a server associated with the protected data resource.

20 Claims, 8 Drawing Sheets

(56) References Cited

U.S. PATENT DOCUMENTS

| | | |
|---|---|---|
| 8,671,385 B2 | 3/2014 | Byrd et al. |
| 8,775,618 B2 | 7/2014 | Razzaq et al. |
| 9,213,966 B2 | 12/2015 | Jin et al. |
| 9,449,346 B1 | 9/2016 | Hockey et al. |
| 9,462,473 B2 | 10/2016 | Ward et al. |
| 9,525,690 B2 | 12/2016 | Burgess et al. |
| 9,754,091 B2 | 9/2017 | Kode et al. |
| 10,104,059 B2* | 10/2018 | Hockey ............... H04L 63/0807 |
| 10,230,714 B2 | 3/2019 | Kaladgi et al. |
| 10,235,672 B2 | 3/2019 | Neuwirth |
| 10,951,564 B1* | 3/2021 | Delp .................. H04W 4/12 |
| 11,025,672 B2* | 6/2021 | Ding ................. H04L 63/1466 |
| 2010/0235882 A1* | 9/2010 | Moore ................ H04L 63/168 709/219 |
| 2015/0254656 A1 | 9/2015 | Bondesen et al. |
| 2017/0091759 A1 | 3/2017 | Selfridge et al. |
| 2017/0104799 A1* | 4/2017 | Prock .................. H04W 4/18 |
| 2017/0255937 A1 | 9/2017 | Maddukuri et al. |
| 2019/0019185 A1 | 1/2019 | Chitalia et al. |
| 2019/0102536 A1 | 4/2019 | Chopra et al. |
| 2019/0318122 A1* | 10/2019 | Hockey ................. H04L 63/102 |
| 2019/0391980 A1* | 12/2019 | Mundar .................. G06F 9/50 |

OTHER PUBLICATIONS

Plaid, retrieved from https://plaid.com/docs/api/2017-03-08/, published on Mar. 8, 2017.

Mensah: "Sustaining Networks in the New Age: Truning Open Banking Into a Sustainable Competitive Advantage", retrieved from https://www.bankseta.org.za/wp-content/uploads/2018/08/Bankseta_Sustaining-Networks_Benjamin-Mensah-Martha-Murorua.pdf, publication date Aug. 2018.

DBS: "Reimagining banking, DBS launches world's largest banking API developer platform"; retrieved from https://www.dbs.com/newsroom/Reimagining_banking_DBS_launches_worlds_largest_banking_API_developer_platform on Sep. 5, 2019.

* cited by examiner

SYSTEMS AND METHODS FOR CONTROLLING THIRD-PARTY ACCESS OF A PROTECTED DATA RESOURCE

CROSS-REFERENCE TO RELATED APPLICATION

The present application claims priority to U.S. patent application Ser. No. 16/561,260 entitled "Systems and Methods for Controlling Third-Party Access of a Protected Data Resource" filed on Sep. 5, 2019, the contents of which are herein incorporated by reference in their entirety.

TECHNICAL FIELD

The present disclosure relates to data security and, in particular, to systems and methods for controlling access to a protected data resource.

BACKGROUND

Private user data may be stored in a protected data resource, such as a secure database. Typically, an access control system would be implemented to prohibit unauthorized access of user data. An access control system may, for example, perform authentication of users and access approval for a protected data resource.

In some contexts, users may wish to grant permission to third-parties to access their data at the protected data resource. For example, a third-party application on a user's device may request permission to retrieve data from a database record associated with the user, and the user may provide, to the access control system, an indication of consent to the data release. The access control system may then allow the requesting application to gain access to the protected data resource for retrieving the user data.

A simple access permissions system often limits the number and scope of actions which can be performed by third-party applications. It would be advantageous to provide an effective solution for handling various different types of third-party requests to access user data at a protected data resource.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
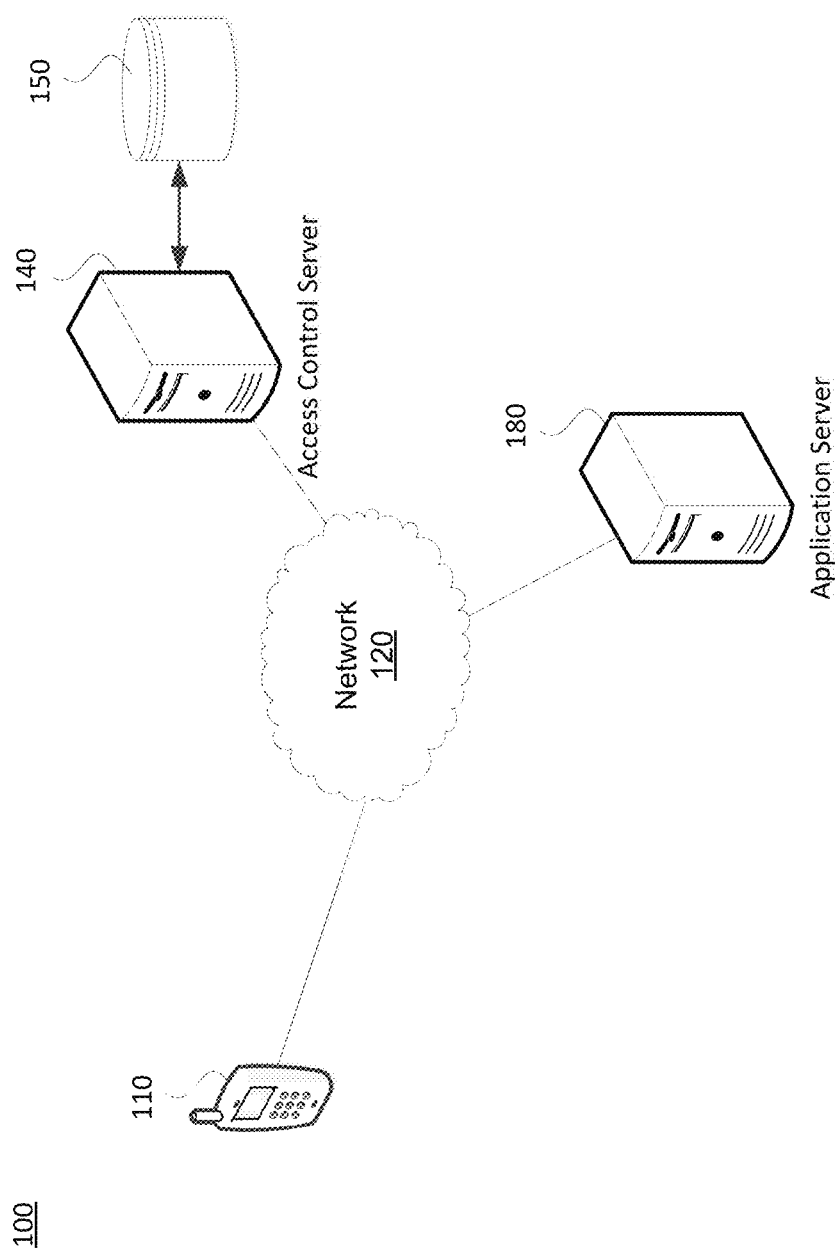
FIG. 1 is a schematic operation diagram illustrating an operating environment of an example embodiment.

In an aspect, the present disclosure describes a computer-implemented method. The method includes: obtaining an access token associated with a first application, the access token including historical operations data identifying operations previously performed by the first application in accessing a user account at a protected data resource; receiving a first request for the first application to perform a first access operation in connection with the user account using the access token; determining that the first access operation is not permitted based on the historical operations data; and in response to determining that the first access operation is not permitted: modifying the first request to obtain a second request for the first application to perform a second access operation using the access token such that a totality of one or more historical operations and the second access operation comply with access permissions for the first application to access the user account; and transmitting the second request to a server associated with the protected data resource.

In some implementations, the first request may comprise a user input requesting to perform the first access operation.

In some implementations, the access token may include metadata which indicates the access permissions for the first application.

In some implementations, the method may further include updating the access token based on changes to the historical operations data.

In some implementations, updating the access token may include modifying the historical operations data to include data for the second access operation.

In some implementations, the first access operation may include a transfer of value from or to the user account.

In some implementations, the access permissions may indicate at least one time period and a maximum permitted value of transfers associated with the at least one time period.

In some implementations, the second access operation may comprise a transfer of value during the at least one time period that is less than the maximum permitted value of transfers associated with the at least one time period.

In some implementations, the access permissions may indicate at least one type of permitted transfer of value for the user account.

In some implementations, the at least one type of permitted transfer of value may include an internal transfer of value between only those accounts belonging to a first user associated with the user account.

In some implementations, the first access operation may comprise access of the user account to retrieve first data.

In some implementations, the second access operation may comprise access of the user account to retrieve a subset of the first data.

In some implementations, the method may further include, in response to determining that the first access operation is permitted, transmitting the first request to the server associated with the protected data resource.

In some implementations, the method may further include modifying a graphical user interface of the first application based on the access permissions for the first application.

In some implementations, modifying the graphical user interface of the first application may include removing selectable user interface elements corresponding to access operations that are not permitted based on the access permissions for the first application.

In some implementations, modifying the graphical user interface of the first application may include modifying one or more user interface elements to correspond to access operations that are permitted based on the access permissions for the first application.

In some implementations, the second request may include an application programming interface (API) call.

In another aspect, the present disclosure describes a computing system. The computing system includes a processor and a memory coupled to the processor. The memory stores instructions that, when executed by the processor, configure the processor to: generate a first access token that includes historical operations data identifying operations previously performed by a first application in accessing a user account at a protected data resource; transmit the first access token to a client device associated with the user account; receive, from the client device, a request for the first application to perform a first access operation in connection with the user account using the first access token; determine that a totality of one or more historical operations and the first access operation comply with access permissions for the first application to access the user account; and in response to the determining, grant, to the first application, access to the user account.

In some implementations, the instructions, when executed, may further configure the processor to: generate a second access token based on updated historical operations data that includes data for the first access operation; and transmit the second access token to the client device.

In some implementations, the instructions, when executed, may further configure the processor to, in response to determining that the first access operation is not permitted, transmit, to the client device, a message indicating that the request for the first application to perform the first access operation is denied.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "granular consent" is intended to refer to user definitions of access permissions for third-parties to access one or more protected resources associated with the user. More specifically, granular consent indicates, for a particular third-party, the access operations that are permitted at a protected resource and rules regarding the permitted access operations. An access control system for the protected resource receives a user's granular consent for a third-party entity to access the protected resource and, based on the received granular consent data, restricts the operations which may be performed by the third-party entity at the protected resource.

By way of example, a third-party application may request to access a user's account in a database to perform an access operation. The user's granular consent for the third-party application may indicate the user's consent for the third-party application to perform the access operation as well as user-defined rules regarding such access operation. In particular, the user-defined rules may impose limits on the access operation when it is performed by the third-party application. For example, if the third-party application is a data transfer application, the user-defined rules may specify one or more thresholds on quantum of data which may be transferred and, in some instances, one or more time periods associated with such thresholds. The rules defined in a user's granular consent may relate to, among others, transfer quantum thresholds, type of transfers, and permitted time periods for transfers.

Access control is an essential element of database security. Various security controls may be implemented for a database to safeguard the data and any operations within the database from unauthorized access. An access control system for a database typically performs functions of authentication and access approval to ensure that only authorized users can gain access to the database. For example, a private database may store account data for a plurality of user accounts, and an access control system for the database may enforce security policies to restrict access to the user account data.

An access control system may enable users to define permissions for others to access their data. In particular, users may specify which subjects are allowed to access their data and what privileges are given to those subjects. For example, account data for user accounts in a database may be accessible to only those entities that have been assigned access rights by the users associated with the accounts. The access control system for the database may limit the scope of permitted access operations based on the permissions that are defined by the users.

In some contexts, users may wish to allow third-party applications access to their data in a protected database. For example, a user may indicate consent for third-party applications on their device to gain direct access to their account data. The concept of "open banking" is an example of a secure, standardized release of private user data to third-parties. Open banking allows users to grant third-party developers access to their banking data. Banks that allow such third-party access may benefit from having a larger ecosystem of applications and services that customers can use to access a wide range of banking functions. In particular, banks would not have to assume all responsibility for applications development by themselves; instead, third-party developers that are granted access to user data can develop applications that are suited for use by the banks' customers.

Generally, delegating access of user account data to third-party applications raises concerns about the security of the data and the safety level of the applications. For example, where a third-party application requests to access highly sensitive user data or to perform database operations that result in permanent changes to the user data, a balance between security of the user data and ease of control of third-party access will be desired.

The present application discloses techniques for securely granting access to user account data for third-parties requesting access to the data. Specifically, methods for managing access permissions for third-party applications to access a user account at a database are described. A permissions manager on a user device may provide the user with the ability to define granular consent for third-party applications. An access control system for the database receives a user's granular consent for a third-party application to access the database and, based on the received granular consent data, restricts the operations which may be performed by the third-party application at the database. The access control system may, for example, respond to requests by third-party applications to access a user's account data. If the access control system determines, based on the granular consent data, that a requested access operation is not among the operations that are permitted for a third-party application, a request for a minimum viable consent is provided to the user device. In particular, the user is prompted to provide a minimum viable consent for the application to access the user account for a specific purpose. The access control system receives an indication of the user's minimum viable consent from the user device and grants, to the requesting third-party application, access to the user account.

The present application also describes an access token that allows a third-party application to securely access user account data at a database. A computing device associated with a user receives an access token associated with a third-party application on the device, where the access token includes granular consent data for the third-party application. The granular consent data indicates access permissions for the third-party application to access a user account at the database. When a first request is received to perform an access operation of accessing the database using the access token, the computing device determines whether the access operation is permitted based on the access permissions. If the access operation is not permitted, the first request is modified to obtain a second request for performing a different access operation that complies with the access permissions. The second request is then transmitted, along with the access token, to an access control system associated with the database.

FIG. 1 is a schematic diagram of an exemplary operating environment in accordance with embodiments of the present disclosure. FIG. 1 illustrates a system 100 for authenticating third-party applications and granting, to the authenticated applications, access to one or more protected data resources 150.

As illustrated, an access control server 140 (which may also be referred to as a server computer system) and client device 110 communicate via the network 120. The client device 110 is a computing device that may be associated with an entity, such as a user or client, having resources associated with the access control server 140 and/or the protected data resource 150. The access control server 140 is coupled to the protected data resource 150, which may be provided in secure storage. The secure storage may be provided internally within the access control server 140 or externally. The secure storage may, for example, be provided remotely from the access control server 140. For example, the secure storage may include one or more data centers. The data centers may, for example, store data with bank-grade security.

The protected data resource 150 may include records for a plurality of accounts and at least some of the records may define a quantity of resources associated with an entity. For example, the entity that is associated with the client device 110 may be associated with an account having one or more records in the protected data resource. The records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance.

In some embodiments, the protected data resource 150 may be a computer system that includes one or more database servers, computer servers, and the like. In some embodiments, the protected data resource 150 may be an application programming interface (API) for a web-based system, operating system, database system, computer hardware, or software library.

The access control server 140 may, for example, be a financial institution server and the entity may be a customer of a financial institution operating the financial institution server.

The client device 110 may be used, for example, to configure a data transfer from an account associated with the client device 110. More particularly, the client device 110 may be used to configure a data transfer from an account associated with an entity operating the client device 110. The data transfer may involve a transfer of data between a record in the protected data resource 150 associated with such an account and another record in the protected data resource 150 (or in another data resource such as a database associated with a different server (not shown) provided by another financial institution, for example). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer whereas the record associated with the entity initiating the data transfer may be adjusted to reflect a decrease in value which is at least as large as the increase in value applied to the record associated with the data transfer recipient.

The system 100 also includes at least one application server 180. The application server 180 is associated with a third-party application (such as a web or mobile application) that is resident on the client device 110. In particular, the application server 180 connects the client device 110 to a back-end system associated with the third-party application. The capabilities of the application server 180 may include, among others, user management, data storage and security, transaction processing, resource pooling, push notifications, messaging, and off-line support of the third-party application. As illustrated in FIG. 1, the application server 180 is connected to the client device 110 and the access control server 140 via the network 120.

The client device 110, the access control server 140, and the application server 180 may be in geographically disparate locations. Put differently, the client device 110 may be remote from one or both of the access control server 140 and the application server 180.

The client device 110, the access control server 140, and the application server 180 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the access control server 140 may provide both data transfer processing (e.g., bill payment) and data holding (e.g., banking) functions. That is, the access control server 140 may be both a financial institution server and also a bill payment processing server. The access control server 140 may, in some embodiments, be a proxy server, serving as an intermediary for requests from client devices 110 to register with an online service. For example, the access control server 140 may be a proxy connecting client devices 110 to servers or data stores processing product purchases and subsequent user registration at an online service offering the products.

Figure 2:
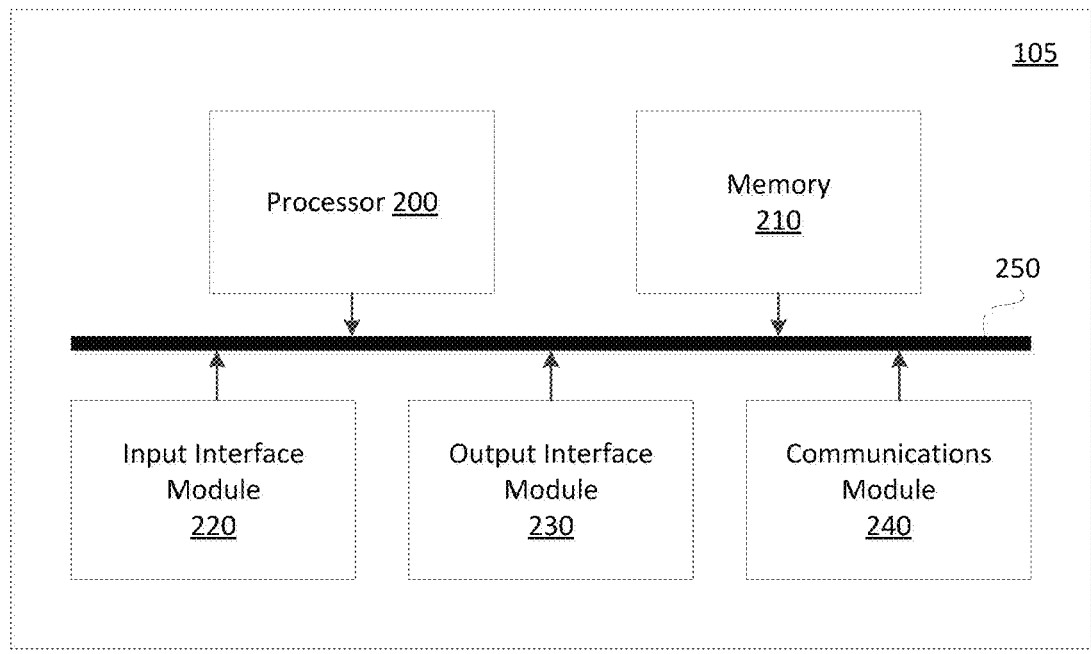
FIG. 2 is a high-level schematic diagram of an example computing device.

FIG. 2 is a high-level operation diagram of the example computing device 105. In some embodiments, the example computing device 105 may be exemplary of one or more of the client device 110, the access control server 140, and the third-party application server 180. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned exemplary input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 3:
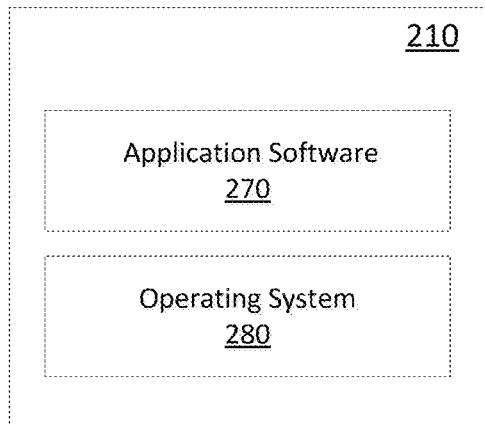
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing particular functions. The application software 270 may, for example, include a user consent management application for a protected resource. A user consent management application may be provided on a client device, and used for requesting, obtaining, and managing the device user's consent for one or more third-party applications to access a user account in a protected resource. For example, a user consent management application may manage consent for a third-party application on the client device to access and/or perform various banking operations in association with a bank account of the device user. In some embodiments, the user consent management application may be tied to a specific data source. That is, the user consent management application may only manage the user's consent for third-party applications to access a specific database (e.g., bank database).

A graphical user interface of the user consent management application may present application data for one or more third-party applications that require user consent for accessing a database. The GUI may also display details of the particular access operations that are requested by the third-party applications. For example, where the user consent management application is associated with a bank database, the GUI may present a list of various banking operations that are available for the user's bank account. The banking operations may include, among others, account data retrieval, transfers to and from the bank account, and payments processing.

The GUI also allows for input of user consent parameters. As will be described in greater detail below, the device user may indicate granular consent for third-party applications to access the user's account at a protected resource. In particular, the GUI may allow the user to define rules governing the access operations that the third-party applications are permitted to perform.

The user consent management application may be configured to send the user consent data to a remote server. Specifically, the user consent management application may obtain a user's consent for third-party applications to access a data source and transmit the user consent data to an access control system associated with the data source. The user consent data may be transmitted at predetermined intervals or upon updates (e.g., additions, deletions, modifications) to the user consent data.

Figure 4:
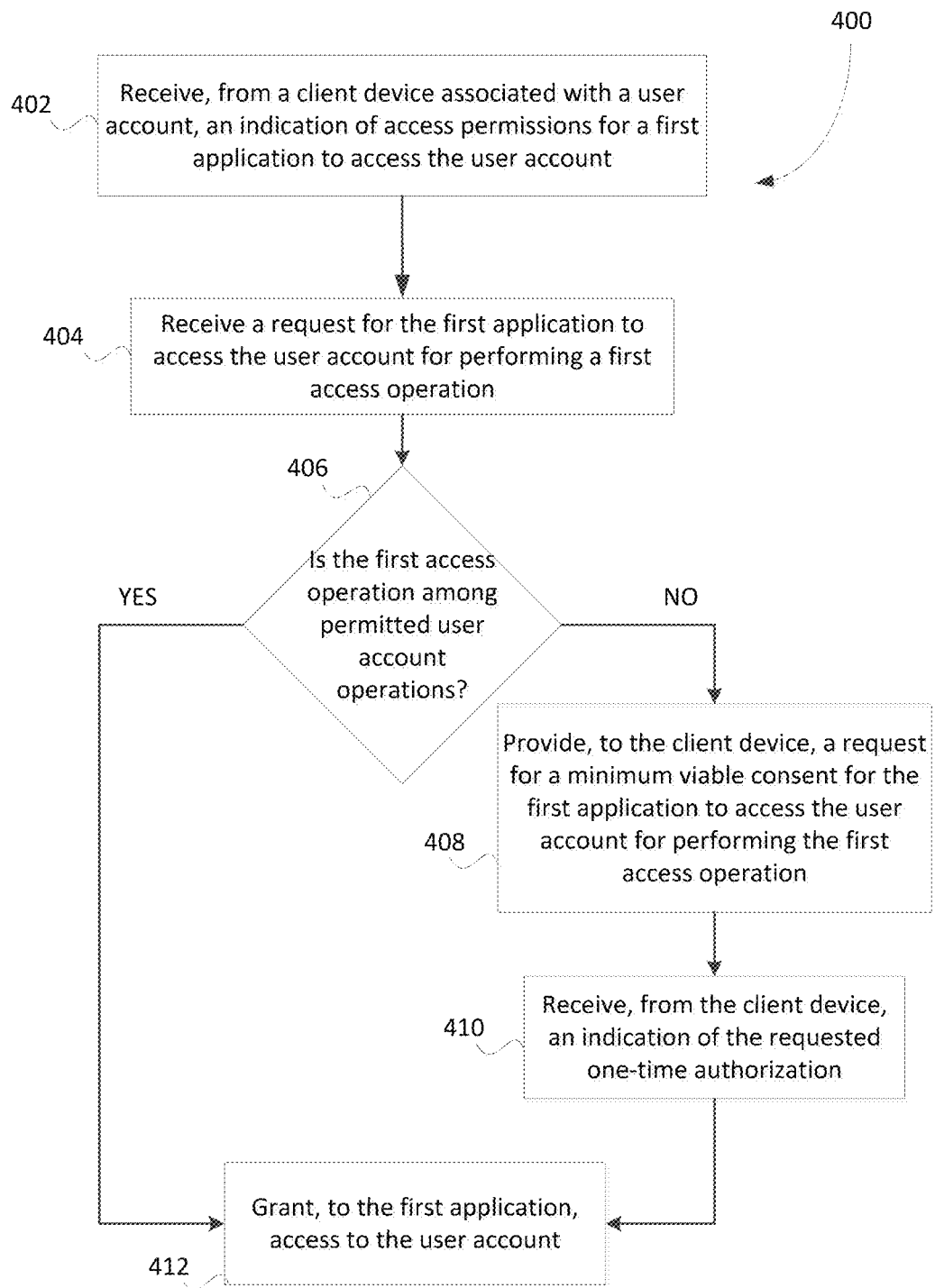
FIG. 4 shows, in flowchart form, an example method for processing third-party requests to access a user account at a protected data resource.

Reference is made to FIG. 4, which shows, in flowchart form, an example method 400 for processing third-party requests to access user data at a protected data resource. Specifically, the method 400 allows for handling requests by a third-party application to access a user account in a protected database. For example, the operations of the method 400 may be performed in obtaining user consent for third-party applications on a user's device to access a user account and applying rules defined by the user consent data in determining whether to grant access to a requesting third-party application.

Operations 402 and onward may be performed by one or more processors of a computing device such as, for example, the processor 200 (FIG. 2) of one or more suitably configured instances of the example computing device 105 (FIG. 2). The method 400 may be performed, for example, by a server system that is communicably connected to a client device associated with a banking account. More generally, an access control system (such as the access control server 140 of FIG. 1) associated with a protected data source may be configured to perform all or some of the operations of method 400.

In operation 402, the server receives, from a client device associated with a user account at a protected resource, an indication of access permissions for a first application to access the user account. In particular, the server receives user consent data indicating access permissions that are assigned by the user to one or more third-party applications on the client device for accessing the user account. The access permissions may comprise granular consent, which defines various rules or policies governing the operations that are permitted by the third-party applications in accessing the user account. For example, the access permissions may indicate restrictions imposed by the user on the permitted access operations by the third-party applications.

In at least some embodiments, the indication of access permissions may be received via a consent management interface that is provided on the client device. For example, a consent management application on the client device may be used to request and obtain user consent data for one or more third-party applications on the client device to access the user account. The consent management interface may be associated with a specific user account, such that the access permissions that are defined by the user via the consent management interface apply to third-party application access of the user account. The graphical user interface of the consent management application may be configured to display user interface elements corresponding to options for defining the access permissions assigned to third-party applications.

The access permissions may be defined using one or more permission levels. That is, the access permissions may include at least one permission level and one or more permitted user account operations that are associated with the at least one permission level. The permitted user account operations for the respective permission levels may be independently defined in the access permissions. For example, a first permission level may define a first set of access operations that are permitted for a third-party application, and a second permission level may define a second set of access operations that are permitted for the third-party application, where the second set is defined independently of the first set. In some embodiments, the permission levels and associated sets of access operations may be, at least in part, defined by developers of the third-party application. In particular, a user may define access permissions for a third-party application by selecting one of the permission levels that are defined by a developer of the third-party application. For example, a consent management interface on the client device may display, for a particular third-party application, one or more permission levels to select from and the access operations associated with the permission levels. A user's selection of a permission level would indicate the user's consent for the third-party application to perform the access operations that are associated with the selected permission level.

In some embodiments, the server may provide the indication of access permissions for the first application to access the user account to an application server associated with the first application. That is, the user-defined access permissions (e.g., rules) governing the first application's access of the user account may be communicated to the application server. In this way, the access permissions data for third-party applications, which may be defined via a consent management interface on the client device that is independent of the third-party applications, can be stored at the application servers associated with the respective third-party applications.

For example, the indication of access permissions for the first application to access the user account may be included in a token that is transmitted to the application server associated with the first application. Upon receiving access permissions data from the client device, the server may identify the third-party applications that are granted access privileges for the user account and generate tokens for transmission to the application servers associated with those third-party applications. Such tokens may, for example, indicate at least one of permissions history for the first application to access the user account or historical operations data associated with the first application. The "historical operations data" for an application will be described in greater detail below with reference to FIGS. 6-9.

In operation 404, the server receives a request for the first application to access the user account to perform a first access operation. The request may be received directly from the first application on the client device, or it may be received from an application server (such as application server 180 of FIG. 1) associated with the first application. As a user interacts with the first application, the user may select a functionality of the first application that requires access to an account of the user in a database. For example, a user may input a request on a third-party mobile shopping app to initiate a payment transfer from a bank account associated with the user in order to purchase a particular product using the app. In response to receiving user selection of a functionality on the first application, the first application may generate a request to access the user's account for performing an account access operation (e.g., payment transfer) based on the selected functionality.

In some embodiments, the first application may request to access a user account, without an express selection by the user of a functionality of the first application. For example, a third-party application may request access to a user account to retrieve account data for the user in order to initialize the user's profile on the third-party application. The retrieved account data may, for example, be used to populate one or more data fields in the user's app profile.

The request by the first application to access the user account may include, at least, identifying information for the client device, an identifier of the first application, login credentials of a user requesting access to the user account via the first application, and the type of access operation (e.g., account data retrieval) to be performed by the first application. The request may be transmitted directly from the client device, or the request may be formatted at an application server associated with the first application and transmitted to the access control system.

Based on information provided in the request from the first application, the server may perform initial authentication of the requesting user. For example, the server may confirm whether the user associated with the requesting instance of the first application is authorized for access of the user account. In some embodiments, the user authentication may be performed at the device level. That is, the user may be authenticated at the client device prior to the first application sending the request to the server for access to the user account.

In operation 406, the server determines whether the first access operation is among the permitted user account operations. That is, the server determines if the first access operation is one of the operations which are indicated to be permitted by the user-defined access permissions for the first application. If the first access operation is determined to be a permitted user account operation, the server grants, to the first application, access to the user account, in operation 412. In particular, the server may provide the first application access to the user account for the limited purpose of performing the requested first access operation. In some embodiments, the server may send an indication of the grant of user account access to an application server associated with the first application. That is, in place of or in addition to sending a message to the client device that the first application is granted access to the user account, the server may communicate the access grant to the relevant application server.

If, on the other hand, the server determines that the first access operation is not among the permitted user account operations, the server generates a request for the user to provide consent for the first application to access the user account for performing the first access operation. The request may indicate, at least, an identifier of the first application and details of the requested first access operation. The server then sends the request to the client device such that the user may be prompted to provide the requested consent, in operation 408. For example, the client device may prompt the user to confirm whether the first application is authorized to perform the first access operation.

In some embodiments, the server may request that the user provide a minimum viable consent for the first application to access the user account. A minimum viable consent (or "consent on-the-fly") refers to a minimum level of user consent that is required for the first application to perform the first access operation in association with the user account. The minimum viable consent may be obtained, for example, in order for the first application to perform an access operation for which user consent has not yet been provided. For example, a graphical user interface for the first application may include a selectable user interface element corresponding to a functionality that requires consent for access of the user's account. Upon selection, by the user, of the user interface element, the first application may recognize that it was not granted sufficient permission to perform the access operation associated with the selected functionality. The first application may then attempt to obtain a minimum viable consent for the access operation to be completed.

As a particular example, a minimum viable consent may be a one-time consent (or authorization) for the first application to access the user account. That is, a limited consent may be provided that is valid for the first application to perform the first access operation only once. Alternatively, the minimum viable consent obtained by the first application may be valid for multiple accesses of the user account. For example, the consent may allow the first application to perform the first access operation of the user account indefinitely (e.g., until the consent is revoked).

In operation 410, the server receives, from the client device, an indication of the requested minimum viable consent. The indication may be in the form of a confirmation of the requested consent, or formatted to include additional conditions or restrictions set by the user for the first access operation. For example, the server may receive a one-time authorization provided by the user for the first application to access the user account and perform the first access operation.

Once the appropriate consent for the first application to perform the first access operation is obtained, the server grants, to the first application, access to the user account, in operation 412. In some embodiments, the server may transmit an access token to an application server associated with the first application. The access token may represent a minimum viable consent, provided by the user, for the first application. For example, the access token may represent a one-time authorization by the user, being valid for a single access of the user account to perform the first access operation.

In an exemplary embodiment, the method 400 may be implemented in the context of access control for a bank database. For example, in open banking, users may be provided the ability to grant third-party applications access to their banking data. In particular, users may define, on their device, access permissions for third-party applications to access their accounts in a bank database. These permissions can then be transmitted to an access control server associated with the bank database, in operation 402.

The access permissions may comprise rules that define parameters of permitted transfers of value to or from a bank account associated with a user. For example, a third-party application may provide, among others, a value transfer functionality for performing transfers from a user's bank account. In some embodiments, the access permissions may indicate at least one type of permitted transfer of value for a user's account. For example, the access permissions may specify that a third-party application is only allowed to make internal transfers of value. That is, the application may be permitted to transfer funds between accounts that are associated with a common user (e.g., transfers from a checking account to a savings account), but cannot make external transfers originating from a user's account to one or more accounts that are not associated with the user. Additionally, or alternatively, the access permissions for a third-party transfer application may indicate that external transfers from the user's account are permitted.

In some embodiments, the recipients for which transfers from the user's account are permitted may be itemized. For example, the access permissions for a third-party application may specify those recipients to whom transfers of value are permitted. A user's granular consent may include rules pertaining to the permitted transfers to the itemized recipients. In particular, the parameters of transfers that are allowed for the itemized recipients may vary. Each recipient may be associated with a respective set of rules defining the parameters of the permitted transfers to that recipient.

In some embodiments, the access permissions may specify constraints on the value of transfers from the user account which may be initiated by a third-party application. For example, a maximum threshold may be imposed on the values of single transfers or on the cumulative value of all permitted transfers from the user account. Any transfer of value which exceeds such threshold would be prohibited (or not permitted) based on the access permissions. In some embodiments, the access permissions may indicate at least one time period during which transfers of value are permitted. For example, the access permissions may identify certain days, weeks, or months on which transfers from the user account by a third-party application are prohibited. The rules relating to threshold values and permitted periods of transfers may be combined. For example, the access permissions may indicate at least one time period and constraints on the value of transfer associated with the at least one period. The access permissions may impose a maximum permitted value of transfer for each of one or more time periods. For example, based on the access permissions, a third-party application may only be permitted to transfer up to a defined maximum threshold value per week (or month, year, etc.).

In some embodiments, the access permissions for a third-party application may include data retrieval permissions. For example, a third-party application may request to access a user's bank account to retrieve certain account data. The parameters of permitted data retrieval operations may be defined in the access permissions for the third-party application. The access permissions may indicate, for example, frequency of data retrieval, type of data which may be retrieved (e.g., account balance, user's transaction history, etc.), and the accounts which may be accessed for data retrieval.

Figure 5:
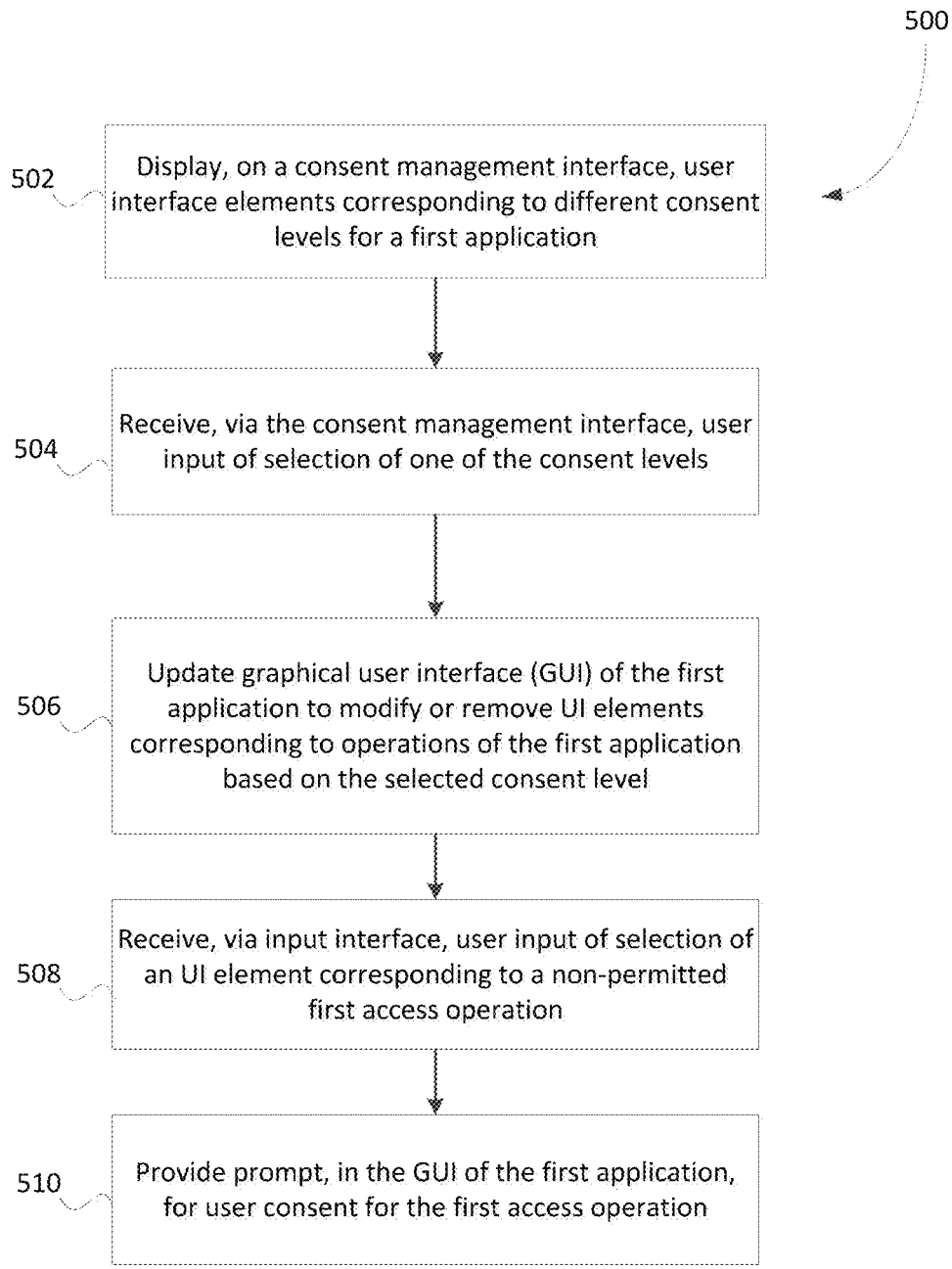
FIG. 5 shows, in flowchart form, an example method for providing a graphical user interface for a consent management interface.

Reference is now made to FIG. 5, which shows, in flowchart form, an example method 500 for providing a graphical user interface for a consent management interface. The method 500 may be implemented by one or more processors of a computing device. Specifically, the operations 502 and onward may be performed by a client device associated with a user. The client device may include one or more third-party applications and at least one consent manager for managing the permissions provided by a user for those third-party applications that request access to a data resource associated with the user.

In operation 502, the computing device displays, on a consent management interface, user interface elements corresponding to one or more different consent levels for a requesting third-party application to access a user account in a data resource. By way of example, the graphical user interface (GUI) of the consent management interface may present options to provide three different consent levels (e.g., "high", "medium", and "low"). Each consent level is associated with a different set of access operations that are permitted for the requesting third-party application. For example, where the data resource is a bank database, a "high" consent level may provide permission for the third-party application to retrieve past transaction data for a user's bank account as well as transfer funds from the bank account, whereas a "low" consent level may only provide permission for the application to retrieve transaction data.

In addition to selection of consent levels, the consent manager may allow a user to define rules governing the access privileges of the third-party application to access the user account. In some embodiments, the GUI of the consent manager may include selectable user interfaces or input data fields for specifying rules relating to the permitted operations of the third-party application. For example, where the third-party application can be used for initiating transfers of value from a user's bank account, the GUI may include selectable user interface elements or input data fields for specifying various rules relating to permitted transfer operations, such as type of transfers (e.g., internal and/or external transfers), time periods, and maximum value of transfers.

In operation 504, the computing device receives, via the consent management interface, user input of selection of one of the consent levels. The selected consent level and the access permissions associated with the selected level apply to the third-party application. That is, the access operations by the third-party application of accessing the user account are constrained by the rules defined by the access permissions associated with the selected consent level.

In at least some embodiments, the operation of the third-party application may be altered based on the user's selection of the consent level for that application. In operation 506, a graphical user interface of the third-party application is updated based on the selected consent level. In particular, the GUI of the application may be updated to modify or remove user interface elements corresponding to one or more user account access operations by the application. In an example embodiment, the display of a GUI for a third-party application which can be used to initiate transfers of value from a user's bank account may be affected by the consent level that is selected. For example, user interface elements which would be used for configuring transfers may not be displayed or may not be selectable if the selected consent level, and/or the associated access permissions, for the third-party application do not allow for such transfer operations. As another example, user interface elements corresponding to value transfer operations may be modified to represent values that are permitted to be transferred by the third-party application. For example, if a value that is displayed on a user interface element exceeds a threshold of permitted transfers, the displayed value may be changed to another value that complies with the threshold constraint.

In some embodiments, UI elements corresponding to non-permitted operations may nevertheless be displayed in the GUI of a third-party application. For example, the GUI may include UI elements corresponding to all access operations of a user's account, whether or not the operations are permitted according to the access permissions for the third-party application. In operation 508, the computing device receives, via an input interface, selection of a UI element corresponding to a non-permitted first access operation. In particular, the access operation associated with a functionality selected by the user is one that is not permitted according to the access permissions for the third-party application which are defined by the user.

The computing device then prompts the user to provide consent for the first access operation, in operation 510. For example, a prompt may be provided in the GUI of the third-party application in response to the user's selection of an UI element corresponding to the first access operation. The prompt may request a minimum viable consent (e.g., one-time authorization) for the third-application to access the user account, or a change to access permissions set by the user for the third-party application. For example, the user may be directed to use a consent management interface on the computing device to modify access permissions for the third-party application. Once the appropriate consent is obtained from the user, the computing device may proceed to perform the first access operation. For example, the computing device may generate an access request to a server, such as an access control server, associated with the data resource to access the user account.

As illustrated with reference to the method 500 of FIG. 5, a third-party application may determine only after having received a user selection of a functionality of the application that a user account access operation corresponding to the selected functionality is not a permitted operation for the application. That is, the application may recognize that an access operation corresponding to a selected functionality is not permitted and only then request to obtain the user's consent for the access operation. This may lead to inefficiencies in processing of the user's request for the selected functionality of the application. For example, a third-party application may issue API calls for user account access operations which are not permitted or available for that application, or may display a user interface suggesting that such access operations are permitted/available when they are, in fact, not.

The present application discloses techniques for allowing third-party applications to determine in an efficient manner whether certain access operations of a user account are permitted. In particular, methods are described for providing user consent data in access tokens that are assigned to specific third-party applications. The access tokens allow the third-party applications to securely access user accounts and account data associated with a user. For example, an access token as described herein may enable a third-party application to access and retrieve user account data in a protected database, and/or to perform one or more database operations on behalf of the user.

Figure 6:
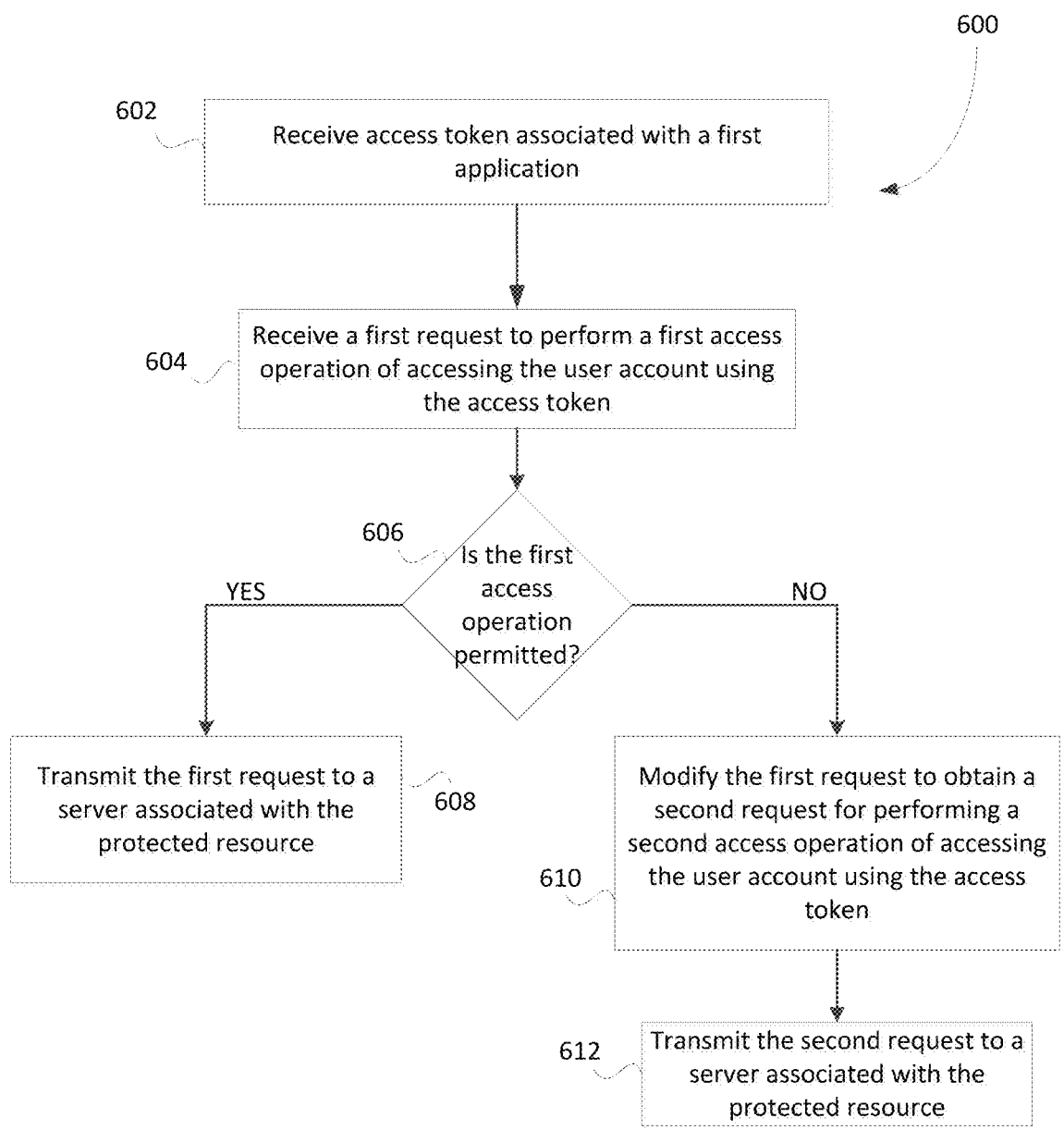
FIG. 6 shows, in flowchart form, another example method for processing third-party requests to a user account at a protected data resource.

Reference is made to FIG. 6, which shows, in flowchart form, an example method 600 for processing third-party requests to access a user account at a protected data resource. Specifically, the method 600 allows for handling requests by a third-party application to access a user account in a protected database. The method 600 may be implemented by one or more processors of a computing device. Specifically, the operations 602 and onward may be performed by a client device associated with a user. The client device may include one or more third-party applications and at least one consent manager for managing the permissions provided by a user for those third-party applications that request access to a data resource associated with the user.

In operation 602, the computing device receives an access token associated with a first application. The access token indicates access permissions for the first application to access a user account at a protected database. In at least some embodiments, the access token indicates granular user consent for the first application in accessing the user account. In particular, the access token may specify access permissions, including rules relating to permitted access operations of the user account, that are defined by the user. For example, the access token may include metadata used by the first application in generating API calls to a server associated with the protected database, and the metadata may include granular user consent data.

In some embodiments, the access token may include historical operations data associated with the first application. The historical operations data may identify operations that were previously performed or initiated by the first application in accessing the user account. For example, where the database is a bank database, a third-party application may be configured to initiate transfers of value (e.g., bill payments, internal transfers between accounts, etc.) from a user's bank account. The historical operations data may comprise transaction data that is associated with the first application—in particular, the historical operations data may identify transactions, such as value transfers, which were initiated by the first application in association with the user account.

In operation 604, the computing device receives a first request to perform a first access operation of accessing the user account using the access token. For example, a user may input selection of a functionality of the first application, and the selected functionality may be associated with the first access operation. The access token that is assigned to the first application may be used in each request by the first application to access the user account. For example, each API call by the first application for accessing the user account may be accompanied by the access token for the first application.

In operation 606, the computing device determines whether the first access operation is permitted for the first application. In particular, the computing device checks the access permissions associated with the first application to determine whether the first access operation is among the operations for which the user has provided consent. In some embodiments, the determination of whether the first access operation is permitted may be based on both the access permissions for the first application and historical operations data associated with the first application. For example, the access token for the first application may include metadata indicating granular user consent and transactions history data for the first application. The computing device may determine whether the first application is permitted to perform the first access operation based on the information included in the metadata of the access token.

If the first access operation is permitted for the first application, the computing device transmits the first request to a server associated with the protected database, in operation 608. For example, the computing device may send the first request to an access control server associated with the database. That is, a request to perform the first access operation by the first application is transmitted to a server which manages access requests for accessing user accounts at the database.

If, on the other hand, the first access operation is not permitted based on the access permissions, the first request is modified to obtain a request that complies with the rules and requirements as indicated in the access permissions.

More specifically, in operation 610, the computing device modifies the first request to obtain a second request for performing a second access operation of accessing the user account using the access token for the first application. The second access operation is an operation that complies with the access permissions for the first application. The second request is then transmitted to a server, such as an access control server, associated with the protected database, in operation 612.

An exemplary embodiment is described in the context of controlling third-party access of a bank database. A third-party application on a user device may request to access a bank account associated with the user. For example, the third-party application may request for access in order to retrieve account data (e.g., bank data, transactions history, etc.) associated with the user or to perform operations which effect changes to the user's bank account, such as account data updates, internal transfers of value between accounts, and external transfers of value from the account (e.g., bill payments, purchase payment processing, etc.).

The access token associated with the third-party application includes access permissions data which indicates the rights and privileges that are assigned to the application in accessing the user's bank account. In particular, the access token may include metadata which defines granular consent provided by the user for the third-party application. The granular consent may include rules relating to the transfer operations that are permitted for the application. In some embodiments, the access permissions may indicate at least one time period and constraints on the permitted value of transfers associated with the at least one time period. For example, maximum permitted values of transfer may be defined for one or more time periods or durations (e.g., days, weeks, etc.). In some embodiments, the access permissions may indicate at least one type of permitted transfer of value for the user account. For example, the third-party application may be limited, based on the access permissions, to making only internal transfers of value between accounts that belong to the same user (e.g., the user associated with the user account).

In operation 606, the computing device may determine whether a first access operation by the third-party application is permitted by the access permissions. In particular, the computing device determines whether an access operation is permitted directly from data included in the access token associated with the third-party application. In some embodiments, the first access operation may be access of the user account to retrieve the user's bank account data, such as transactions history, current and historical balance data, limits on transfer values, etc. If the first access operation of retrieving first data (e.g., all account data for the user's bank account) is not permitted, the computing device may generate a second request for a second access operation of retrieving only a subset of the first data. For example, the second request may be for the third-party application to retrieve only account balance data for the user's bank account.

In some embodiments, the requested first access operation may be a transfer of value from the user's bank account that is initiated by the third-party application. The computing device determines, based on consent data included in the access token associated with the third-party application, whether a first access operation of transferring a first value during a specific time period is permitted. For example, the computing device may check a user's granular consent data included in the access token to determine whether the first access operation complies with user-defined rules of the granular consent. If the first access operation is not permitted, the computing device may generate a second request for a second access operation of transferring a value that is permitted by the access permissions for the application. For example, the second access operation may be a transfer of value during the time period that is less than a maximum permitted value of transfer associated with the time period, imposed on transfer operations by the application.

Figure 7:
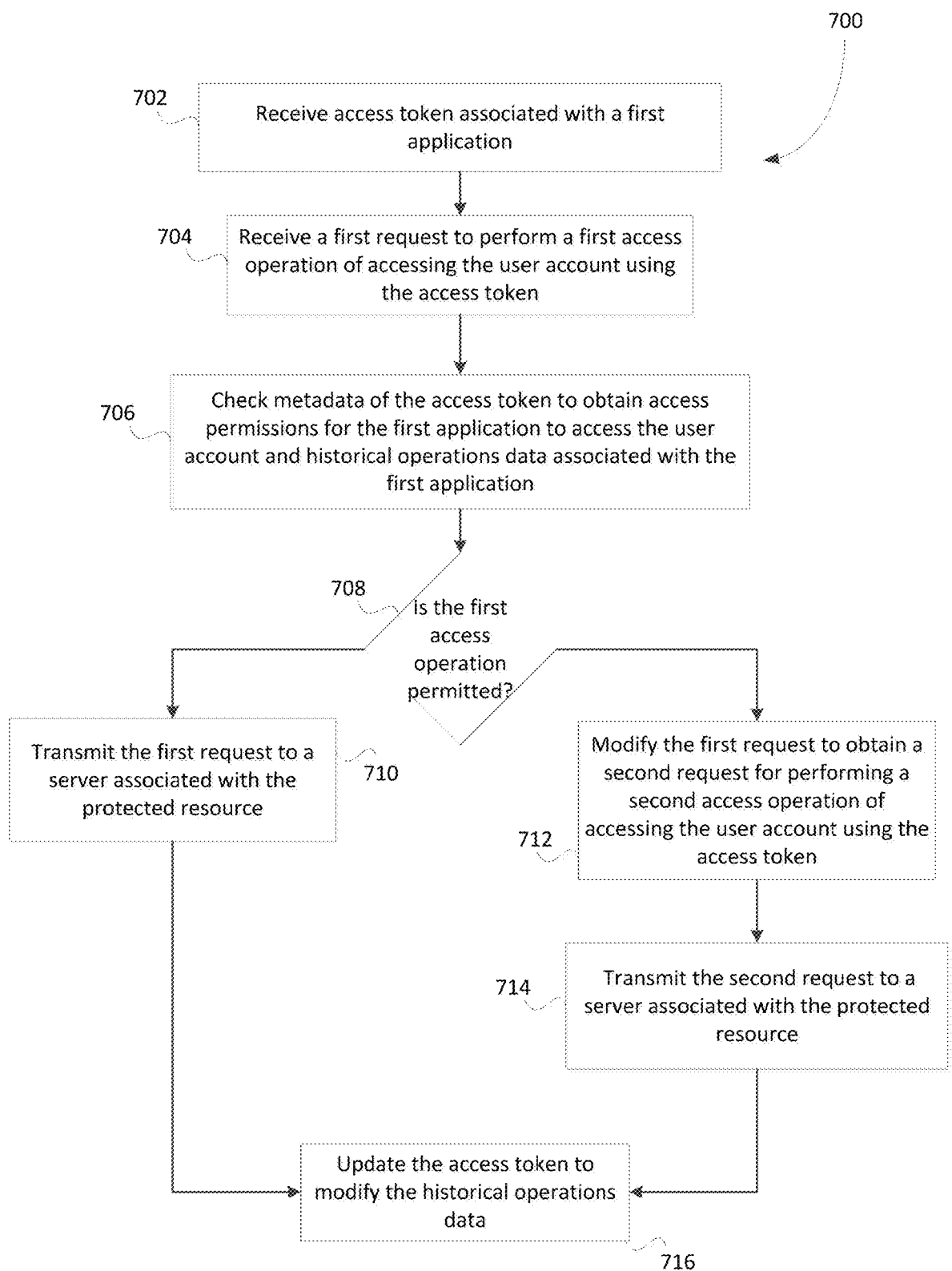
FIG. 7 shows, in flowchart form, an example method for processing an access token associated with a third-party application for accessing a protected data resource.

Reference is made to FIG. 7, which shows, in flowchart form, another example method 700 for processing third-party requests to access a user account at a protected data resource. Specifically, the method 700 allows for handling requests by a third-party application to access a user account in a protected database. The method 700 may be implemented by one or more processors of a computing device, such as a client device associated with the user. The operations 702 and onward may be performed by as alternatives or in addition to the operations of method 600 described above.

Operations 702 and 704 are performed in a similar manner as operations 602 and 604 of method 600. In particular, the computing device receives an access token associated with a first application on the computing device, where the access token indicates access permissions for the first application to access a user account in a database, in operation 702. In operation 704, the computing device receives a first request to perform a first access operation of accessing the user account using the access token associated with the first application. For example, the first application may detect a user-initiated event, such as user selection of a functionality of the first application, that suggests that an API call is to be made using the access token. The first request (i.e. API call) may then be generated, requesting for the first application to perform an access operation corresponding to the user-selected functionality.

Prior to making the API call, the computing device checks the metadata of the access token to obtain access permissions for the first application and historical operations data associated with the first application, in operation 706. In this way, the first application may determine, based on granular consent data and historical operations data in the access token, whether the API call complies with rules defined by the consent data. In particular, the computing device determines, in operation 708, whether the first access operation is permitted.

Operations 710 to 714 correspond to operations 608 to 610 of method 600 and may be performed in a similar manner. If the computing device determines that the first access operation is permitted, the first request can be transmitted to a server, such as an access control server, associated with the database. If, on the other hand, the first access operation is determined to be not permitted, the computing device modifies the first request to obtain a second request for a second access operation of accessing the user account, in operation 712, and transmits the second request to the server associated with the database, in operation 714. The second access operation is an operation that complies with the access permissions for the first application.

The generation of the second request may be informed by both the granular consent data and the historical operations data in the access token assigned to the first application. For example, the consent data may include rules specifying one or more time periods and thresholds on values of transfers from the user account during the time periods that are permitted for the first application. An example rule may specify, for example, that the first application is only permitted to transfer $1000 during any span of 30-days. The computing device may check the historical operations data included in the access token to identify how much value has been transferred during the most recent span of 30-days and determine a value of transfer that is permitted for the first application. In particular, the computing device may determine a maximum value that can be transferred (i.e. remaining capacity for transfers), given the restriction of $1000 of transfers per month and historical transfers made by the first application in the most recent month. The computing device can thus ensure that access operations by the first application do not violate the user-defined rules defined of the access permissions, as indicated in the access token associated with the first application.

In at least some embodiments, the access token may be a dynamic token that is updated to include new metadata. For example, in operation 716, the access token may be updated based on changes to historical operations data associated with the first application. After an access operation of transferring value from the user's account is performed by the first application, the access token associated with the first application may be updated to indicate details of this access operation (i.e. transaction). More generally, the access token may be updated after events or actions that are affected by the rules defined by the user consent data or that effect changes to the historical operations data. In some embodiments, an access control server which issued the access token may update the access token based on details of an access operation by a third-party application. For example, after a third-party application requests to access a user's account in a database using an access token, an access control server associated with the database may grant access to the third-party application and update the access token to record data relating to the access operation that is performed by the third-party application. In some embodiments, the updating of the access token may be performed on the computing device (i.e. client device). In particular, the third-party application may update its associated access token after performing an access operation of a user's account in a database. For example, upon gaining access to a user's account and performing an access operation, a third-party application may record details of the access operation (e.g., transfer transaction, account data retrieval, etc.) in the access token stored device-side.

Figure 8:
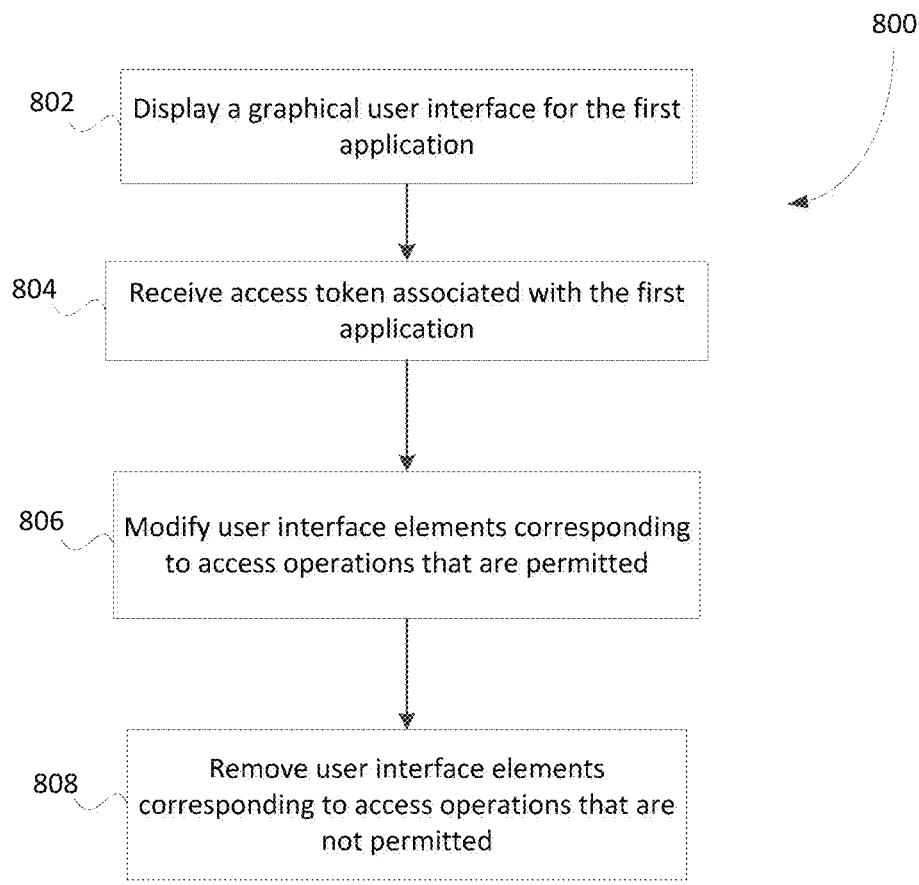
FIG. 8 shows, in flowchart form, an example method for updating a graphical user interface for a third-party application based on access permissions of the third-party application.

Reference is made to FIG. 8, which shows, in flowchart form, an example method 800 for updating a graphical user interface for a third-party application based on access permissions for the third-party application. In particular, the method 800 may allow the GUI of an application to be updated based on user consent data for the application and historical operations data associated with the application. The method 800 may be implemented by one or more processors of a computing device, such as a client device associated with the user.

In operation 802, the computing device displays a graphical user interface for a first application. An access token associated with the first application is then received by the computing device, in operation 804. The access token indicates access permissions for the first application in accessing a user account in a protected data resource. For example, the access token may include metadata containing user consent data for the first application, defining rules governing the access operations that are permitted for the first application.

In a GUI for the first application, the computing device may display various user interface elements representing selectable functionalities that require access to a user account in a database. For example, a GUI of a value transfer application may include selectable user interface elements for initiating transfers of varying values. In at least some embodiments, the user interface elements may graphically represent limits on the associated access operations. For example, a user interface element for initiating a value transfer may represent a threshold value of transfers, indicating that an amount of the transfer is capped based on the user consent rules for the first application.

In operation 806, the computing device modifies one or more of the user interface elements corresponding to access operations that are permitted for the first application based on data in the access token associated with the first application. In some embodiments, the user interface elements corresponding to permitted operations may be updated to reflect changes in historical operations data for the first application. For example, if a consent rules specifies a threshold on a value of transfers that are permitted for a given time period, a user interface element corresponding to the transfer operation may be updated after a certain transfer using the first application, to reflect a maximum value of transfers (i.e. remaining capacity on value transfers) which would not violate the consent rules. The GUI can then display the modified user interface element for the transfer operation to represent an available limit for future transfer operations.

Based on the consent rules and historical operations data for the first application, the computing device may remove user interface elements that correspond to access operations that are not permitted, in operation 808. For example, if a particular access operation becomes unavailable as a result of an access operation by the first application, the user interface element associated with the access operation may be removed from the GUI. An access operation may become unavailable if performing the access operation would result in violation of the user consent rules for the application. For example, in the case of a transfer operation which transfer of value from a user's bank account, the transfer operation becomes unavailable when a further performance of that operation would exceed a maximum threshold imposed on value transfers by the first application.

Figure 9:
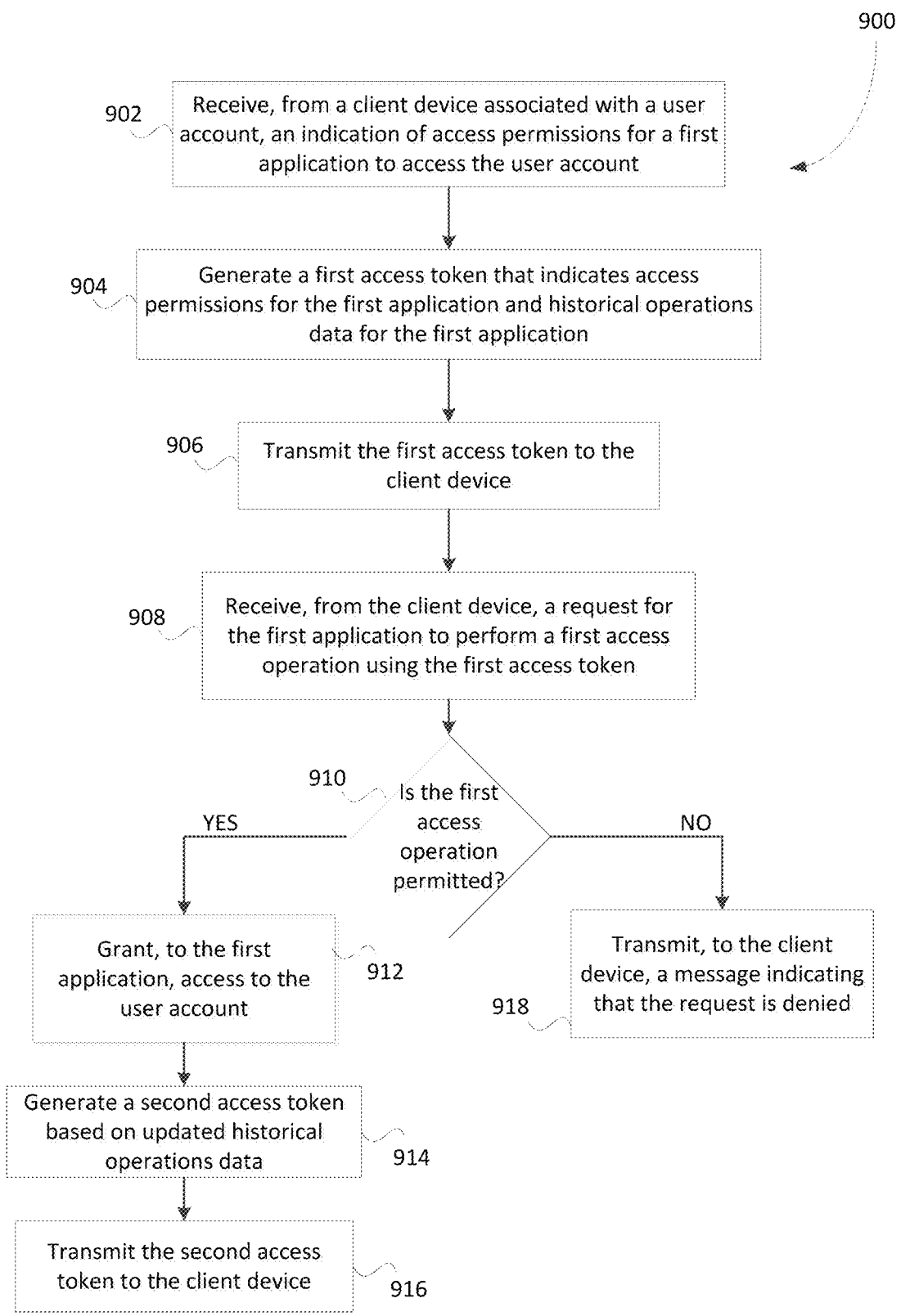
FIG. 9 shows, in flowchart form, another example method for processing an access token associated with a third-party application for accessing a user account at a protected data resource.

The access tokens described above may, in at least some embodiments, be issued by a server that is associated with a protected data source. For example, an access control server for a protected database may issue access tokens to third-party applications that request access to a user account in the database. Reference is made to FIG. 9, which shows, in flowchart form, an example method 900 for processing third-party requests to access user data at a protected data resource. Specifically, the method 900 allows for handling requests by a third-party application to access a user account in a database. The operations of method 900 may be performed by one or more processors of a computing system associated with an issuer of access tokens for third-party applications, such as an access control server associated with the database.

In operation 902, the server receives, from a client device associated with a user account, an indication of access permissions for a first application to access the user account. In some embodiments, the access permissions may be transmitted via a consent management interface on the client device. That is, the user may input the user's consent for the first application using the consent management interface, and the inputted consent data may be transmitted to the server. The access permissions may, for example, define granular user consent including rules relating to the access operations that are permitted for the first application.

In operation 904, the server generates a first access token that indicates access permissions for the first application and historical operations data for the first application. The historical operations data indicate operations previously performed by the first application in accessing the user account. The server may store historical operations data for the first application, which identifies previous operations performed by the first application at the database. For example, where the first application is configured to access the user account to initiate transactions or transfers from the account, the historical operations data may comprise transactions history data for the first application in association with the user account.

The server transmits the first access token to the client device, in operation 906. When the server later receives, in operation 908, a request from the first application to perform a first access operation using the first access token, the server determines whether the first access operation is permitted based on the data included in the first access token. In particular, the server determines, in operation 910, if the first access operation is permitted based on the access permissions and historical operations data of the first access token. For example, the server checks whether the requested first access operation would violate the consent rules defined in the access permissions, given the operations history of the first application in accessing the user account.

If the first access operation is not permitted, the server may transmit, to the client device, a message indicating that the request is denied, in operation 918. The error message may indicate a problem with the request from the first application. For example, the error message may identify a consent rule associated with the first application that would be violated by performance of the requested first access operation.

If, on the other hand, the first access operation is permitted, the server grants, to the first application, access to the user account, in operation 912. For example, the server may provide the first application access to an API call for performing the first access operation of the user account in the database.

In some embodiments, the server may additionally generate a second access token based on updated historical operations data for the first application, in operation 914. In particular, the second access token may be updated to include details of the first access operation that was just performed by the first application. The server may then transmit the second access token to the client device, in operation 916.

The example embodiments of the present application have been described above with respect to third-party applications that are resident on a user's client device. It should be noted, however, that the disclosed systems and methods may be applicable more generally for managing user account access requests by various different types of third-party applications or services. For example, the third-party applications may be cloud-based applications that are available to users on-demand via a computer network (e.g., Internet), or web-based applications that are hosted on the web and run in a web browser.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer-implemented method, comprising:
obtaining an access token associated with a first application, the access token including historical operations data identifying operations previously performed by the first application in accessing a user account at a protected data resource;
receiving a first request for the first application to perform a first access operation in connection with the user account using the access token;
determining that the first access operation is not permitted based on the historical operations data; and
in response to determining that the first access operation is not permitted:
modifying the first request to obtain a second request for the first application to perform a second access operation using the access token such that a totality of one or more historical operations and the second access operation comply with access permissions for the first application to access the user account; and
transmitting the second request to a server associated with the protected data resource.

2. The method of claim 1, wherein the first request comprises a user input requesting to perform the first access operation.

3. The method of claim 1, wherein the access token includes metadata which indicates the access permissions for the first application.

4. The method of claim 1, further comprising updating the access token based on changes to the historical operations data.

5. The method of claim 4, wherein updating the access token comprises modifying the historical operations data to include data for the second access operation.

6. The method of claim 1, wherein the first access operation comprises a transfer of value from or to the user account.

7. The method of claim 6, wherein the access permissions indicate at least one time period and a maximum permitted value of transfers associated with the at least one time period.

8. The method of claim 7, wherein the second access operation comprises a transfer of value during the at least one time period that is less than the maximum permitted value of transfers associated with the at least one time period.

9. The method of claim 1, wherein the access permissions indicate at least one type of permitted transfer of value for the user account.

10. The method of claim 9, wherein the at least one type of permitted transfer of value comprises an internal transfer of value between only those accounts belonging to a first user associated with the user account.

11. The method of claim 1, wherein the first access operation comprises access of the user account to retrieve first data.

12. The method of claim 11, wherein the second access operation comprises access of the user account to retrieve a subset of the first data.

13. The method of claim 1, further comprising, in response to determining that the first access operation is permitted, transmitting the first request to the server associated with the protected data resource.

14. The method of claim 1, further comprising modifying a graphical user interface of the first application based on the access permissions for the first application.

15. The method of claim 14, wherein modifying the graphical user interface of the first application comprises removing selectable user interface elements corresponding to access operations that are not permitted based on the access permissions for the first application.

16. The method of claim 15, wherein modifying the graphical user interface of the first application comprises modifying one or more user interface elements to correspond to access operations that are permitted based on the access permissions for the first application.

17. The method of claim 1, wherein the second request comprises an application programming interface (API) call.

18. A computing system, comprising:
a processor; and
a memory coupled to the processor, the memory storing instructions that, when executed by the processor, configure the processor to:
generate a first access token that includes historical operations data identifying operations previously performed by a first application in accessing a user account at a protected data resource;
transmit the first access token to a client device associated with the user account;
receive, from the client device, a request for the first application to perform a first access operation in connection with the user account using the first access token;
determine that a totality of one or more historical operations and the first access operation comply with access permissions for the first application to access the user account; and
in response to the determining, grant, to the first application. access to the user account.

19. The computing system of claim 18, wherein the instructions, when executed, further configure the processor to:
generate a second access token based on updated historical operations data that includes data for the first access operation; and
transmit the second access token to the client device.

20. The computing system of claim 19, wherein the instructions, when executed, further configure the processor to, in response to determining that the first access operation is not permitted, transmit, to the client device, a message indicating that the request for the first application to perform the first access operation is denied.

* * * * *